Figure 1:
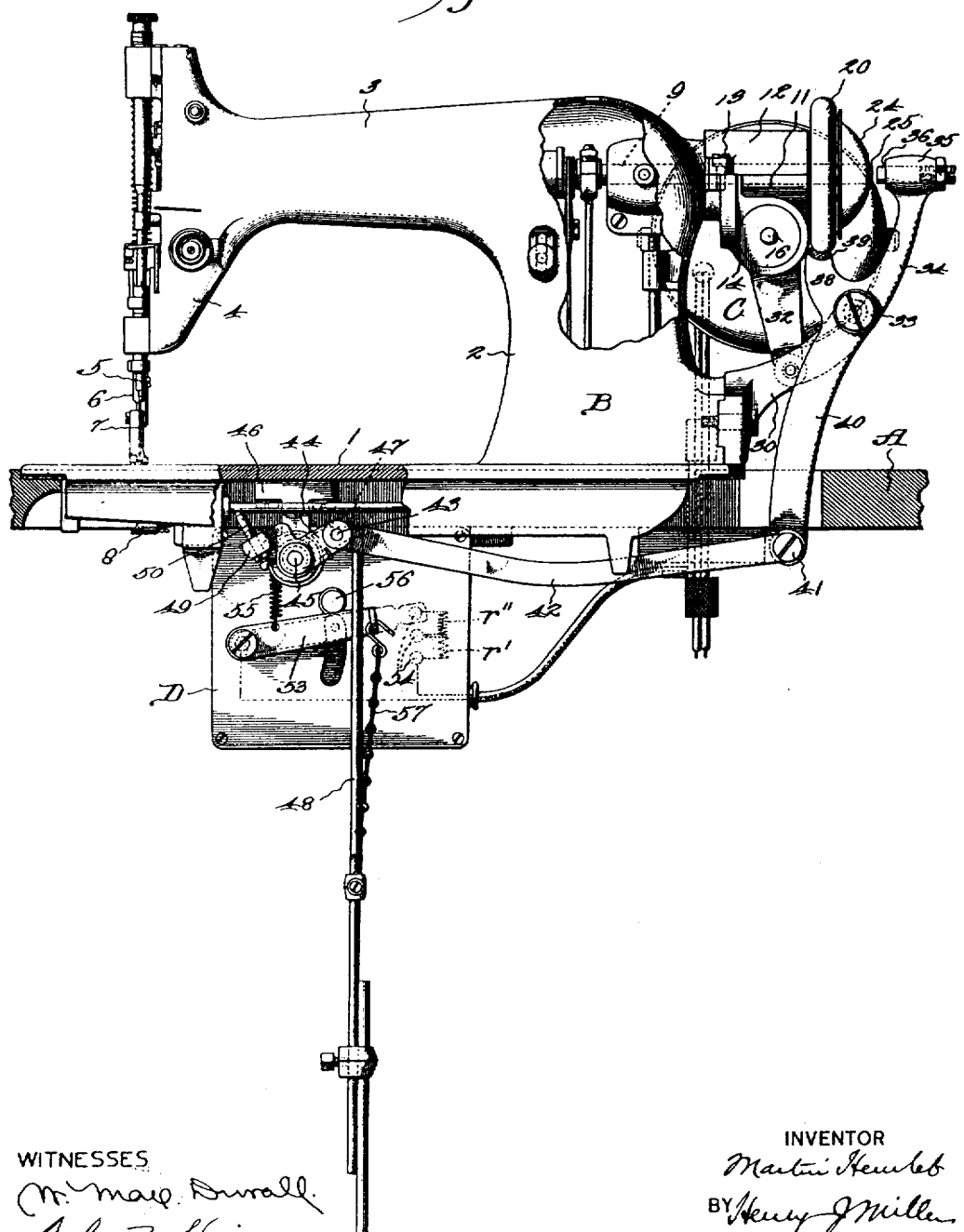

M. HEMLEB.
DRIVING AND CONTROLLING MECHANISM FOR POWER OPERATED MACHINES.
APPLICATION FILED MAY 28, 1918.

1,384,464.

Patented July 12, 1921.

4 SHEETS—SHEET 1.

INVENTOR
Martin Hemleb
BY Henry J Miller
ATTORNEY

WITNESSES

M. HEMLEB.
DRIVING AND CONTROLLING MECHANISM FOR POWER OPERATED MACHINES.
APPLICATION FILED MAY 28, 1918.

1,384,464.

Patented July 12, 1921.

4 SHEETS—SHEET 4.

WITNESSES

INVENTOR
Martin Hemleb
BY
Henry J. Miller
ATTORNEY

UNITED STATES PATENT OFFICE.

MARTIN HEMLEB, OF ELIZABETH, NEW JERSEY, ASSIGNOR TO THE SINGER MANUFACTURING COMPANY, A CORPORATION OF NEW JERSEY.

DRIVING AND CONTROLLING MECHANISM FOR POWER-OPERATED MACHINES.

1,384,464.      Specification of Letters Patent.      Patented July 12, 1921.

Application filed May 28, 1918. Serial No. 236,975.

*To all whom it may concern:*

Be it known that I, MARTIN HEMLEB, a citizen of the United States, residing at Elizabeth, in the county of Union and State of New Jersey, have invented certain new and useful Improvements in Driving and Controlling Mechanisms for Power-Operated Machines, of which the following is a specification, reference being had therein to the accompanying drawings.

This invention relates to combined electric-motor and power-transmitting mechanism adapted, more particularly, for use in driving and controlling the operation of small machines which require to be accelerated practically instantaneously or very quickly from zero to full speed and as quickly stopped.

In a power-driven sewing machine, for example, intended for factory use, it is of prime importance that the driving and controlling means be designed to permit quick starting and stopping of the machine in order that the operator may attain the desired rate of production, and, for this reason, it has heretofore been the practice to run the driving motor continuously at full speed and provide a quick acting, manually controlled, friction clutch-and-brake device for establishing and interrupting driving relation between the motor and the machine.

While it is well known that an electric motor making 5000 to 8000 revolutions per minute is smaller in size and cheaper to manufacture than a motor of lower speed, it has heretofore not been considered feasible to use such a high speed motor in connection with a friction clutch device for the reason that it is undesirable, because of the noise, wear and tear, centrifugal strains, &c., to have the motor racing idly at high speed during the periods when it is disconnected from the machine.

It has also been customary to utilize a belt drive between the motor and the machine, together with a friction-clutch device; the motor being usually located beneath the table upon which the machine is supported. A belt-drive, however, under these conditions is inefficient and rapid acceleration of the machine cannot be accomplished thereby without utilization of an abnormally heavy belt and motor.

If the motor is operatively connected to the machine without the use of a clutch device and must therefore be stopped each time the machine is stopped, considerable time is lost during the periods of relatively slow acceleration of the motor. If an attempt is made to accelerate quickly, an excessive and wasteful starting current will be drawn by the motor.

The present invention, therefore, has for an object to provide a combined motor and power-transmitting mechanism overcoming the foregoing defects, and permitting the use of a high-speed motor making, preferably, more than one revolution for each revolution of the main-shaft of the machine to be driven.

A further object of the invention is to provide a combined motor and power-transmitting device, which will be efficient and economical of electric current and which will permit practically instantaneous starting or stopping of the machine without destructive jar or shock.

Still further, the invention has for an object to provide a combined motor and power-transmitting mechanism which will be simple in construction, easy to operate and the parts of which are easy of access for inspection, adjustment, repairs, or the like.

The invention also aims to provide an improved motor drive in the form of an attachment suitable for application to known types of sewing machines.

With the above and other objects in view, as will hereinafter appear, and without limiting the invention, it has been applied to a high speed sewing machine of the type commonly used in garment factories for manufacturing purposes. The motor is preferably of the series wound type having preferably a normal speed of approximately 6,000 revolutions per minute and connected directly to a driving element of a friction-clutch device mounted upon the frame of the sewing machine. The driven element of the clutch-device is splined to the main-shaft of the machine and is shiftable into and out of engagement with the driving element by means of a treadle-controlled starting and stopping lever. One of the features of novelty of the present device resides in the construction whereby the motor is not stopped when the clutch is thrown out but is permitted to slow down and run at a predetermined idle speed, whereby the motor may attain full speed in a very brief space of time without drawing an excessive starting current. A motor-controller or rheostat is connected in the motor-circuit and is provided with a shiftable contact-device or arm which is connected to the same treadle which operates the clutch-device. When the treadle is released, the clutch-elements are separated, the brake is applied to the driven clutch-element, and the contact-arm of the motor-controller is shifted to a position causing the motor to run at a low speed, attained preferably by causing the controller-arm to switch a predetermined value of resistance into the motor-circuit without opening said circuit. When the treadle is depressed, the controller-arm cuts out the resistance, preferably in two steps, thus quickly accelerating the motor. Just as the controller-arm reaches full speed position the clutch-disks are pressed together by the starting and stopping lever. The motor therefore reaches substantially full speed before it is connected to the machine. These operations take place very quickly and smoothly and, to an observer, would appear to be accomplished practically instantaneously.

Another feature of novelty resides in the provision, in the form of an attachment applicable to the usual outwardly projecting bearing boss for the main-shaft of a sewing machine, of a motor frame adapted to fit over and be secured to said bearing boss; the motor-shaft being arranged transversely of the sewing machine shaft and geared to the latter.

Figure 2:
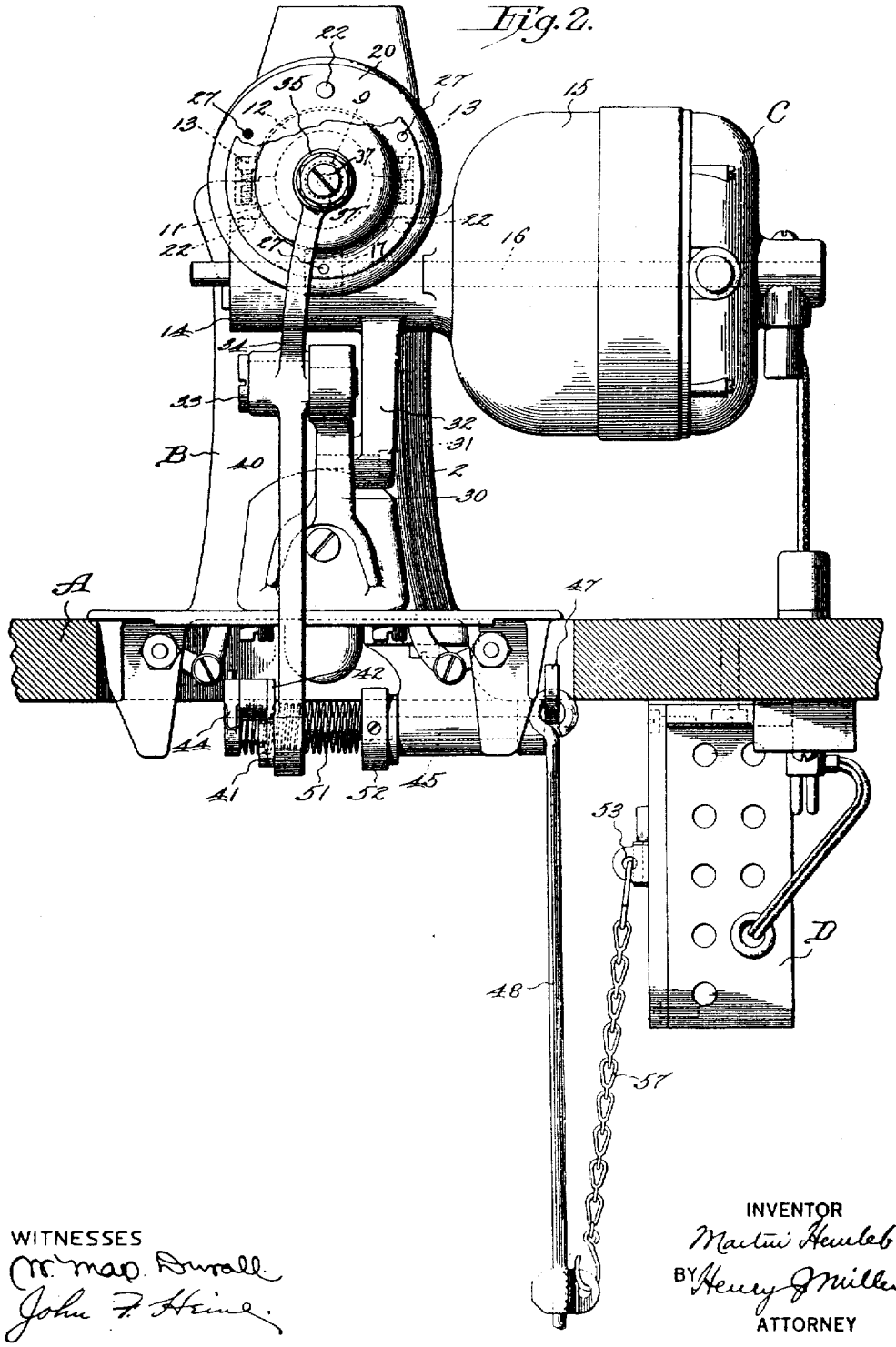
Figure 3:
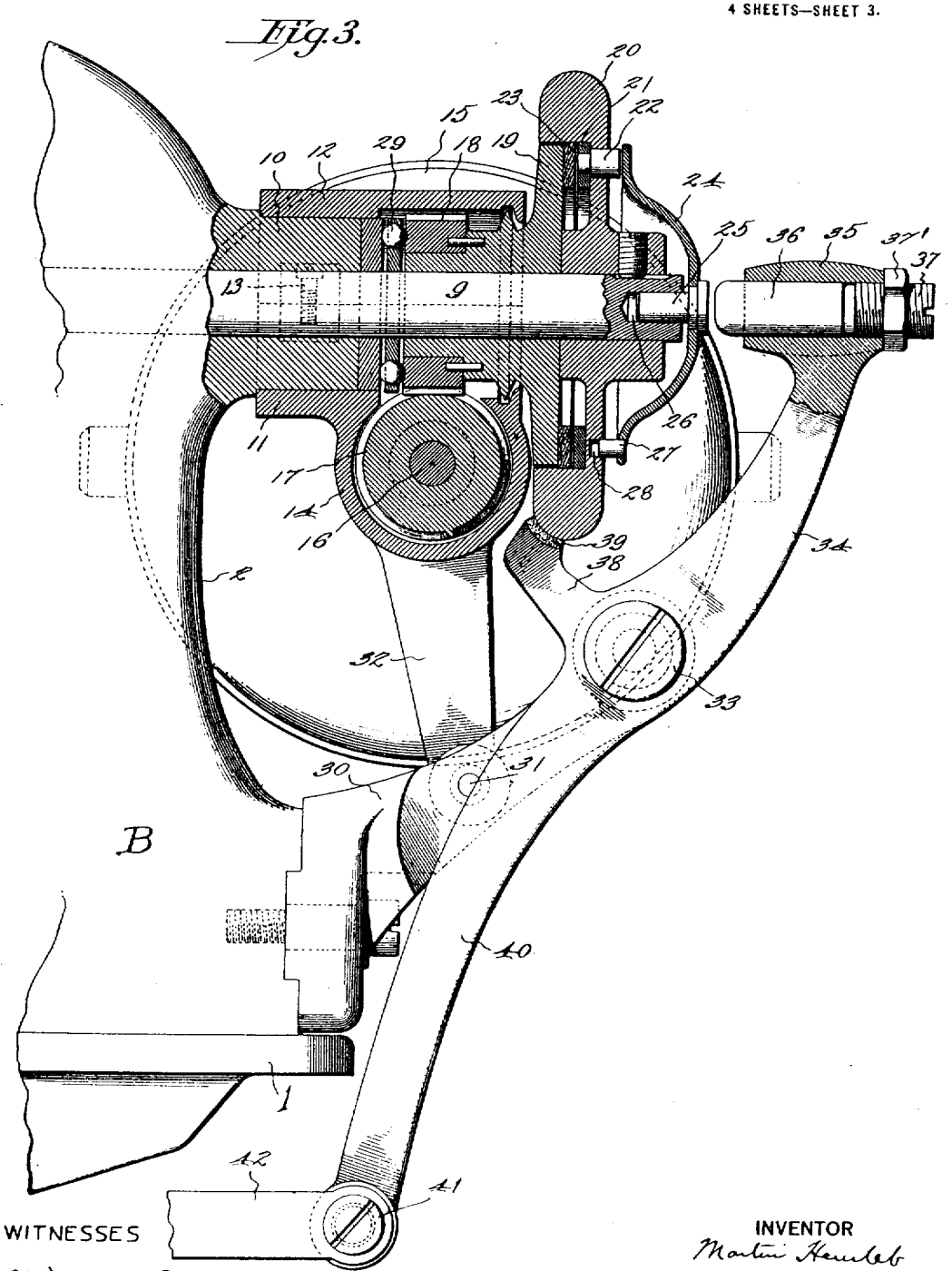
Figure 4:
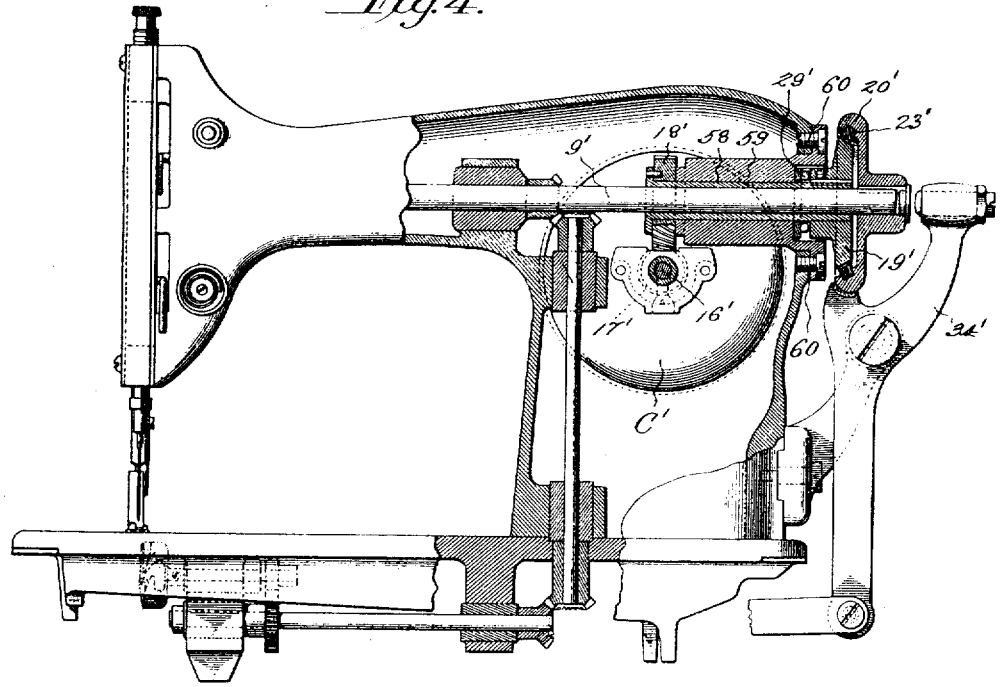
Figure 5:
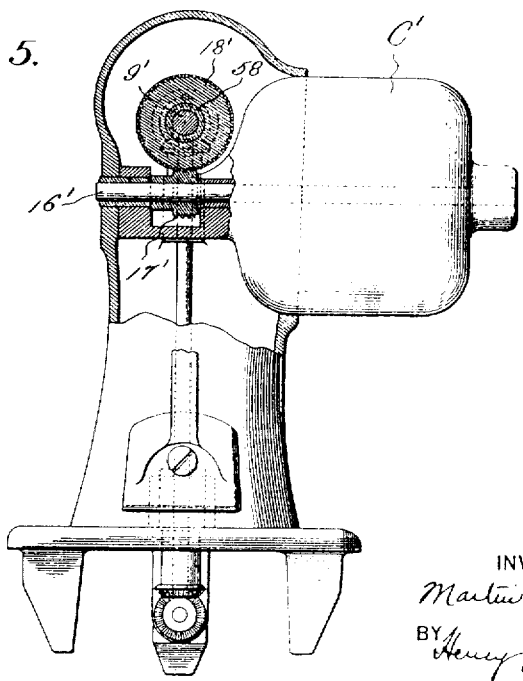

In the accompanying drawings, Figure 1 is a side elevation of the driving mechanism as applied to a sewing machine. Fig. 2 is a rear end elevation of the machine and driving mechanism. Fig. 3 is an enlarged sectional view of the power-transmitting connections between the motor and the machine. Figs. 4 and 5 are side and rear elevations, respectively, of a modification of the invention.

Referring to Figs. 1, 2 and 3, A represents the usual table-top upon which is supported a sewing machine B of any usual type. In the present embodiment, the machine B is formed with a frame including the bed 1, standard 2 and bracket-arm 3 terminating in the head 4 which supports the usual needle and presser-bars 5 and 6, respectively, the former carrying the needle 7 which coöperates with a suitable loop-taker 8 disposed beneath the bed 1. The main-shaft 9 of the machine is journaled in the bracket-arm 3 and is operatively connected to the various instrumentalities of the machine in any usual or suitable manner.

Clamped to the rearwardly extending cylindrical bearing boss 10 for the main-shaft 9 is a split cylindrical housing comprising a lower part 11 and an upper part 12 secured together about the boss 10 by the clamping screws 13. The lower part 11 of the cylindrical housing is formed integral with the transversely arranged elongated housing 14 forming an integral part of the frame 15 of a self-contained electric motor C which may be of any suitable type but is preferably a small series-wound commutator motor adapted to run at high speed on either direct or alternating current. The motor comprises a power-transmitting shaft 16 which is journaled axially of the elongated housing 14 and is directed transversely to and in non-intersecting relation with the main-shaft 9 of the sewing machine. Within the housing 14 the motor-shaft 16 has fixed thereto a worm 17 meshing with a gear 18 pinned to the reduced hub of the driving element or disk 19 of a friction-clutch device; the disk 19 being mounted to turn freely upon the main-shaft 9.

The driven element 20 of the clutch-device is in the form of a hand-wheel fixed to the main-shaft 9 and recessed in its forwardly disposed face to fit over or receive the driving disk 19. Mounted within the recessed face of the hand-wheel 20 is a ring 21 having fixed thereto three lateral pins 22 spaced 120° apart circumferentially of said ring and projecting through suitable guiding apertures in the hand-wheel 20 to the rearward face of the latter. The ring 21 is thus constrained to rotate with the driven element 20 but may be shifted axially of the main-shaft 9 toward the driving disk 19, between which and the ring 21 is interposed a ring 23 of compressed cork, leather or other material suitable for friction-driving purposes. The ring 23 is preferably unattached to either the disk 19 or ring 21 and may be readily removed in disassembling the device.

As a means for pressing upon the pins 22 to establish driving relation between the disk 19 and wheel 20, a bell-shaped pusher 24 is employed. The pusher 24 has fixed thereto an axially disposed headed guide-pin 25 freely entering an axial aperture 26 in the end of the main-shaft 9. The pusher 24 also has fixed to its peripheral edge-portion three guide-pins 27 freely entering corresponding guide-apertures 28 in the rearward face of the driven element 20. Referring to Fig. 2, it will be noted that the pins 27 are arranged in alternation with the pins 22. To sustain the driving disk 19 against the thrust of the pusher 24 a ball thrust-bearing 29 is interposed between the gear 18 and the free end of the bearing boss 10.

Screwed to the standard 2 is a bracket 30 to which is secured at 31 a brace-member 32 projecting downwardly from the motor-frame. The primary purpose of the bracket 30, however, is to serve as a support for the fulcrum-pin 33 of a three-armed clutch-actuating lever, the upwardly extending arm 34 of which is socketed at 35 to receive a push-pin 36 of anti-friction material such as oil-soaked hard wood backed by a threaded pin 37 and adapted to be forcibly pressed into engagement with the headed pin 25 of the bell-shaped pusher 24. A nut 37' serves to lock the threaded pin 37 in adjusted position in the socket 35. The brake-arm 38 of the three-armed lever carries a shoe 39 of friction-material adapted to be pressed against the periphery of the hand-wheel 20 when the pin 36 is retracted to interrupt driving relation between the elements of the clutch.

The downwardly extending arm 40 of the three-armed actuator lever is pivotally connected at 41 to one end of a link 42 extending lengthwise of and beneath the table-top A. The other end of the link 42 is pivotally connected at 43 to a crank-arm 44 fixed to one end of a cross-shaft 45 journaled in a suitable bracket 46 screwed to the under side of the bed 1. Fixed to the other end of the cross-shaft 45 is a crank-arm 47 from the eyed extremity of which depends a treadle-rod 48. A downward pull upon the treadle-rod will rock the shaft 45, thus straightening the toggle formed by the pivotally connected arm 44 and link 42 and rocking the actuator lever 40—34 to carry the push-pin 36 into forcible clutch-actuating engagement with the bell-shaped element 24. The shaft 45 carries an arm 49 into which is adjustably threaded a stop-pin 50 which is adapted to strike the under surface of the bed 1 and arrest the toggle-straightening movement of the shaft 45 when the pivotal connection 43 is substantially coincident with a line joining the axis of the shaft 45 and the pivot 41. A coil spring 51, fixed at one end to the collar 52 screwed to the shaft 45 and at its other end hooked under the arm 44, tends to elevate the latter and break the toggle when the treadle-rod is released.

The motor-controller D may be of any of the usual types adapted to control motor-speeds. In the present embodiment, the controller D is conveniently made up in the form of a rheostat which is secured to the under side of the table-top A. The rheostat comprises a pivotally mounted arm 53 adapted to make electrical contact with a series of preferably three resistance points 54 serving as terminals for two resistance coils $r'$ and $r^2$. The spring 55 yieldingly maintains the contact arm 53 against the stop 56 and in electrical contact with the uppermost resistance point 54, thus including the resistance coils $r'$ and $r^2$ in series with the motor-circuit and causing the motor to run at relatively low speed when the sewing machine is stationary. A chain 57, depending from the contact arm 53 is connected to the treadle-rod 48. The parts are so proportioned and adjusted that as the treadle-rod is drawn downwardly the resistance coils $r^2$ and $r'$ are successively cut out of the motor circuit, causing the motor to be very rapidly accelerated to full speed. Immediately after the contact arm meets the lowermost resistance point 54 the motor attains full speed and the lever 34 establishes driving relation between the motor C and the machine B.

When pressure upon the treadle is relieved the springs 51 and 55 elevate the treadle-rod 48 and contact-arm 53, thus disconnecting the motor from the machine and applying the brake-shoe 39 to the hand-wheel 20. At the same time the speed of the motor is reduced due to the switching of the resistance coils $r'$ and $r^2$ into the motor circuit.

In the modification of the invention shown in Figs. 4 and 5, the motor C' is mounted in register with an aperture at the rear side of the standard 2 of the machine with its power-shaft 16' extending transversely of the main-shaft 9' of the machine and through said aperture. The motor-shaft 16' carries the worm 17' which meshes with a gear 18' pinned to a tubular shaft 58 journaled with a bearing boss 59 entering an aperture in the machine frame and having its flanged rearward extremity screwed to the said frame at 60. The tubular shaft 58 forms a bearing for the main-shaft 9' which extends through it and has fixed to its rearward extremity a driving element or disk 19' of a friction-clutch device. One face of the driven element 20' of the clutch device is recessed to fit over the driving disk 19' and carries a ring 23' of friction material, such as leather, adapted to be pressed against the conical edge surface of the disk 19'. The driven element 20' is splined to the main-shaft 9' to rotate with the latter but may be shifted toward the driving disk 19' by means of a treadle-controlled actuator-arm 34' similar in construction to that described in connection with Figs. 1, 2 and 3, the treadle and motor-controller mechanism being substantially the same as that previously described. A ball-thrust bearing 29' is provided between the hub of the driving disk 19' and the bearing boss 59 to sustain the pressure caused by the actuator-arm 34' as it forces the driven element 20' against the driving element 19'.

Various changes in details of construction may obviously be made by those skilled in the art without departure from or sacrifice of the advantages of the invention expressed in the appended claims.

Having thus set forth the nature of the invention, what I claim herein is:—

1. A sewing machine, comprising in combination, a frame, stitch-forming mechanism incorporated in said frame and including a main-shaft, a driving motor carried by said frame and having a power-shaft extending transversely of said main-shaft, and operative connections including a manually controlled friction clutch device between said shafts, said clutch device including rotary driving and driven elements the axes of which are in alinement with the axis of said main-shaft.

2. A sewing machine, comprising in combination, a frame, stitch-forming mechanism incorporated in said frame and including a main-shaft, a driving motor carried by said frame and having a power-shaft extending transversely of said main-shaft, and operative connections between said shafts, said connections including a worm and gear drive and a manually controlled friction clutch device, including separable driving and driven elements.

3. A sewing machine comprising, in combination, a frame, stitch-forming mechanism incorporated in said frame and including a main-shaft, a self-contained motor unit detachably carried by said frame and including a power-transmitting shaft, a manually controlled friction clutch including separable driving and driven elements, positive driving connection between said power-shaft and driving element, and an operative connection between said driven element and the main-shaft of the machine.

4. A sewing machine comprising, in combination, a frame, stitch-forming mechanism incorporated in said frame and including a main-shaft, a driving motor carried by said frame and having a power-shaft disposed transversely of said main-shaft, a manually controlled friction clutch shaft including separable driving and driven elements, positive driving connection between said power-shaft and driving element, and an operative connection between said driven element and the main-shaft of the machine.

5. In a sewing machine, in combination, a frame including a bracket-arm, stitch-forming mechanism incorporated in said frame and including a main-shaft journaled lengthwise of said bracket-arm, a motor having a power-shaft journaled to rotate in fixed non-intersecting relation with and transversely of said main-shaft, a manually controlled friction clutch device including separable driving and driven elements, and positive driving connections between said power-shaft and driving element and between said driven element and the main-shaft.

6. A sewing machine comprising, in combination, a frame including a bracket-arm, stitch-forming mechanism incorporated in said frame and including a main-shaft journaled lengthwise of said bracket-arm and having an outboard projection, a driving motor having a power-shaft disposed transversely of said main-shaft, and a manually operable clutch connection between the motor-shaft and the outboard projection of said main-shaft.

7. In a sewing machine, in combination, a frame, stitch-forming mechanism incorporated in said frame and including a main-shaft having an out-board projection, a manually controlled clutch-device including a driven element mounted upon said out-board projection and a driving element disposed between said driven element and the frame of the machine, a motor having a power-shaft disposed transversely of said main-shaft and positive driving connections between said power-shaft and driving element.

8. In a sewing machine, in combination, a frame including a bracket-arm, stitch-forming mechanism incorporated in said frame and including a main-shaft journaled lengthwise of said bracket-arm, a motor element having a power-shaft journaled transversely of said main-shaft, a manually controlled friction clutch-device including relatively movable driving and driven elements arranged axially of said main-shaft, and a worm and gear driving connection between said power-shaft and driving element, said driven element being rotatably connected to said main-shaft.

9. The combination with a machine having a main-shaft to be driven, of a manually controlled clutch-device including driving and driven elements, said driving element being mounted to turn upon and relatively to said main-shaft and said driven element being connected with but free to slide axially of said main-shaft, a thrust-bearing between said driving element and the frame of the machine for sustaining the manually controlled pressure of said driven element against the driving element, and a motor having a power-shaft in positive driving engagement with said driving element and the axis of which shaft is displaced from the axis of said main-shaft.

10. The combination with a clutch-device comprising driving and driven elements and treadle-controlled mechanism for establishing and interrupting driving relation between said elements, of an electric motor connected to said driving element, and a motor-controller including a shiftable member connected to said treadle-mechanism, the parts being so constructed and arranged that when the treadle is released the shiftable member is positioned to cause the motor to run at a predetermined low speed and, when the treadle is depressed, to accelerate the motor before driving relation between said driving and driven elements is established.

11. The combination with a clutch-device comprising driving and driven elements and treadle-controlled mechanism for establishing and interrupting driving relation between said elements, of an electric motor connected to said driving element, and a motor-controller in the form of a rheostat including a plurality of contact-points and a shiftable contact-arm connected to said treadle-mechanism, the parts being so constructed and arranged that when the treadle is released the contact-arm is shifted to include a definite value of resistance in the motor-circuit thereby causing the latter to run at a predetermined low speed and, when the treadle is depressed, to cut out said resistance before driving relation between said driving and driven elements is established.

12. The combination with a machine to be driven including a frame having an outwardly projecting bearing boss and a main-shaft journaled in and projecting outwardly beyond said bearing boss, of motor-frame supporting means fixed to and embracing said bearing boss, a power-shaft journaled in said motor-frame, a driven clutch-element operatively connected to said main-shaft, a live clutch-element journaled on said main-shaft and operatively connected to said power-shaft, and manually controlled means for establishing and interrupting driving relation between said clutch elements.

13. The combination with a machine to be driven including a frame having an outwardly projecting bearing boss and a main-shaft journaled in and projecting outwardly beyond said bearing boss, of motor-frame supporting means fixed to and embracing said bearing boss, a power-shaft journaled in said motor-frame and extending transversely of said main-shaft, a driven clutch-element operatively connected to said main-shaft, a live clutch element journaled on said main-shaft and operatively connected to said power-shaft, and manually controlled means for establishing and interrupting driving relation between said clutch elements.

14. The combination with a machine to be driven including a frame having an outwardly projecting bearing boss and a main-shaft journaled in and projecting outwardly beyond said bearing boss, of motor-frame supporting means fixed to and embracing said bearing boss, a power-shaft journaled in said motor-frame, a driven clutch-element operatively connected to said main-shaft, a live clutch-element journaled on said main-shaft, a speed-reducing connection between said power-shaft and live clutch-element, and manually controlled means for establishing and interrupting driving relation between said clutch elements.

15. In a machine having a shaft to be driven, in combination, a driven element, a driving element out of contact with said driven element, a treadle operated toggle device operated when straightened to establish driving contact between said elements, an electric motor connected to said driving element, and a motor speed regulator connected to the operating means for said toggle device, and timed to accelerate the motor on no load before said driving contact is established.

16. A motor attachment for sewing machines comprising, a motor frame having an aperture adapted to fit over and be secured to a projecting portion of a sewing machine frame, a power-shaft journaled in said motor-frame transversely of the axis of said aperture and a driving gear fixed to said motor-shaft and adapted to mesh with a companion gear connected to the main-shaft of the sewing machine.

17. The combination with a machine to be driven including a frame having an outwardly projecting bearing boss and a main shaft journaled in and projecting outwardly beyond said bearing boss, of motor-frame supporting means fixed to and embracing said bearing boss, a power-shaft journaled in said motor-frame, and an operative connection between the power and main shafts.

18. In a sewing machine, in combination, a frame, stitch-forming mechanism incorporated in said frame and including a mainshaft having an outboard projection, the machine frame including a bearing extension adjacent the outboard projection of the mainshaft, a driving motor having a frame apertured to receive the bearing extension of the sewing machine frame and a power-shaft arranged transverse to the axis of said aperture, and operative connections between said power and main shafts.

In testimony whereof, I have signed my name to this specification.

MARTIN HEMLEB.